(12) United States Patent
Fritsch et al.

(10) Patent No.: US 8,275,509 B2
(45) Date of Patent: Sep. 25, 2012

(54) SPEED DETECTION FOR A TACHOGRAPH SYSTEM

(75) Inventors: Gerd Fritsch, München (DE); Gunnar Schmidt, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 304 days.

(21) Appl. No.: 12/310,611

(22) PCT Filed: Aug. 28, 2007

(86) PCT No.: PCT/EP2007/058913
§ 371 (c)(1),
(2), (4) Date: Apr. 13, 2009

(87) PCT Pub. No.: WO2008/025763
PCT Pub. Date: Mar. 6, 2008

(65) Prior Publication Data
US 2010/0191413 A1    Jul. 29, 2010

(30) Foreign Application Priority Data
Aug. 29, 2006  (DE) .................. 10 2006 040 297

(51) Int. Cl.
*G01M 17/013* (2006.01)
*G06F 7/02* (2006.01)
*G06F 19/00* (2006.01)

(52) U.S. Cl. ............... 701/30.6; 701/29.7; 701/30.3; 701/30.5; 701/31.3; 701/32.4

(58) Field of Classification Search ............ 701/34, 701/35, 33, 32, 31, 29, 29.7, 30.3, 30.5, 30.6, 701/31.3, 32.4; 342/357.25, 357.22, 357.2, 342/357.35; 702/142; 713/150; 340/441
See application file for complete search history.

(56) References Cited

U.S. PATENT DOCUMENTS

| | | | | |
|---|---|---|---|---|
| 5,463,373 A * | 10/1995 | Widl et al. | ............... | 340/441 |
| 5,569,848 A * | 10/1996 | Sharp | ............... | 73/146.2 |
| 6,011,461 A * | 1/2000 | Luper | ............... | 340/441 |
| 6,426,694 B1 * | 7/2002 | Larson | ............... | 340/441 |
| 6,721,634 B1 * | 4/2004 | Hauler et al. | ............... | 701/1 |
| 6,865,456 B2 * | 3/2005 | Kin et al. | ............... | 701/33.9 |
| 7,113,082 B2 * | 9/2006 | Tsuruhara et al. | ............... | 340/441 |
| 7,191,041 B2 * | 3/2007 | von Schwertfuehrer et al. | ............... | 701/31.7 |
| 7,522,034 B1 * | 4/2009 | Price | ............... | 340/456 |

(Continued)

FOREIGN PATENT DOCUMENTS
CH    687 352    11/1996

(Continued)

*Primary Examiner* — Paul N Dickson
*Assistant Examiner* — Karen A Beck
(74) *Attorney, Agent, or Firm* — Cozen O'Connor

(57) ABSTRACT

System and method for detecting and storing at least speed as an information relevant for resignation for a tachograph system. to provide a tamperproof tachograph system offering a high degree of security. An arithmetic unit detects signals for determining the speed from at least two independent sensors and compares them with each other and stores a sensor-related error message if the signals deviate significantly from each other. The signals of at least three independent sensors are compared with each other in the arithmetic unit and are checked for their plausibility by excluding any signals that significantly deviate from a plurality of signals and determining the speed of the vehicle to be stored only using one or more of those signals that deviate from each other only within defined limits.

15 Claims, 2 Drawing Sheets

U.S. PATENT DOCUMENTS

| | | | |
|---|---|---|---|
| 7,574,292 B2* | 8/2009 | Hoeffel et al. | 701/32.4 |
| 7,821,421 B2* | 10/2010 | Tamir et al. | 340/901 |
| 2002/0036567 A1* | 3/2002 | Larson | 340/442 |
| 2003/0088348 A1* | 5/2003 | Gustavsson et al. | 701/35 |
| 2003/0093188 A1* | 5/2003 | Morita et al. | 701/1 |
| 2005/0073399 A1 | 4/2005 | Inoue et al. | |
| 2005/0080527 A1* | 4/2005 | Tao et al. | 701/34 |
| 2006/0259216 A1* | 11/2006 | Roberts et al. | 701/29 |
| 2007/0219686 A1* | 9/2007 | Plante | 701/35 |
| 2009/0043435 A1* | 2/2009 | Kane et al. | 701/19 |
| 2010/0191413 A1* | 7/2010 | Fritsch et al. | 701/34 |
| 2011/0066319 A1* | 3/2011 | Bechtler et al. | 701/34 |
| 2011/0093159 A1* | 4/2011 | Boling et al. | 701/32 |
| 2011/0119013 A1* | 5/2011 | Onea et al. | 702/96 |
| 2011/0295549 A1* | 12/2011 | Takabayashi et al. | 702/142 |

FOREIGN PATENT DOCUMENTS

| | | |
|---|---|---|
| DE | 42 02 583 | 4/1993 |
| DE | 43 26 831 | 2/1995 |
| DE | 44 35 014 | 3/1996 |
| DE | 195 21 411 | 12/1996 |
| DE | 196 15 248 | 10/1997 |
| DE | 100 15 304 | 10/2001 |
| DE | 102 10 320 | 11/2002 |
| DE | 10 2004 046 254 | 5/2005 |
| DE | 10 2005 005 048 | 8/2006 |
| EP | 0 638 877 | 2/1995 |

\* cited by examiner

SPEED DETECTION FOR A TACHOGRAPH SYSTEM

PRIORITY CLAIM

This is a U.S. national stage of application No. PCT/EP2007/058913, filed on 28 Aug. 2007, which claims Priority to the German Application No.: 10 2006 040 297.9, filed: 29 Aug. 2006; the content of both being incorporated here by reference.

The present invention concerns itself with a method for detecting and storing at least the speed as a piece of registration-relevant information for a tachograph system, in which a computation unit is used to detect signals for determining the speed of at least two independent sensors and to check them for plausibility by comparing them, and a sensor-related error message is stored if the signals differ significantly. The invention also concerns itself with a tachograph system of this kind.

Tachograph systems are used in vehicles to capture and store particular information. For example, tachograph systems are used in heavy goods vehicles or in buses, to comply with legal recording obligation for the registration-relevant information in the case of particular types of vehicle and uses of vehicle. The tachograph systems are furthermore used to check compliance with the legally prescribed traveling times and breaks and also to check the speed limits. The tachograph systems essentially comprise a registration unit and a sensor for ascertaining the speed, which is also called a speed sensor. The disks of paper on which the speed of travel was plotted by the tachograph, as known from earlier tachographs, have been replaced by memory in the form of a chip card in modern tachographs, what are known as digital tachographs (DTCO). In the case of digital tachographs, the speed sensor supplies data from which the registration unit calculates, and stores on the chip card, all registration-relevant data, such as speed, distance traveled, etc. The speed sensor is in this case not only a time recording sensor but also the only data source for calculating the speed as registration-relevant or obligatorily recorded information. To prevent manipulation of the tachograph system, the speed sensor is sealed with the vehicle gearbox. In addition, the connection between the speed sensor and the registration unit is made by means of a standardized protocol which has appropriate encryption. However, it has been found that if a speed sensor has been manipulated despite the security precautions then manipulation of the system is not recognized, which means that erroneous data are registered. In addition, if the speed sensor fails, it is no longer possible for the registration-relevant data to be recorded.

DE 196 15 248 A1 discloses a method for determining a speed for a vehicle in which the speed is determined from the speed of a wheel. To comply with legal requirements, a correction value is intended to ensure that the speed indication for the vehicle is under no circumstances lower than the actual speed. The correction value is obtained by virtue of the capture of position data and the detection of a speed calculated from the position data. This is intended to take account of the wear on the tire profile or of the loading state and the tire pressure, for example.

In addition, DE 100 15 304 A1 describes a navigation system in which a navigation appliance is used to detect different journey parameters such as speed, angular acceleration, linear acceleration, accident indicators, etc., and to store them on a chip card. Measures for protecting against manipulation or for recognizing an erroneous sensor are not provided. The navigation system is merely a kind of tachograph which has been extended by the function of an accident recorder, also known as the "black box", which stores driving data in the last minutes or seconds prior to an accident in order to be able to reconstruct the course of the accident.

US 2003/088348 A1 and EP 0 638 877 propose methods of the type cited at the outset. DE 102 10 320 A1 concerns itself with driving time inspection in heavy goods vehicles by means of dual recording.

An object of the present invention is to provide a method which protects against manipulation of a tachograph system as much as possible.

The invention achieves the object by means of a method of the type cited at the outset, in which a computation unit is used to detect signals for determining the speed of at least two independent sensors and to compare them with one another, and a sensor-related error message is stored if the signals differ significantly.

The invention achieves the object by means of a method of the type cited at the outset in which a sensor has an associated pilot function and the pilot sensor is checked for plausibility using the signals from the other sensors, wherein, in the case of signals which are supplied by a plurality of the sensors and which differ from one another within particular limit values only, a signal from the pilot sensor which differs significantly there from is flagged as erroneous, the speed is ascertained using only the plausibility-checked signals from the other sensors, and an error message is stored in the memory.

The advantage of the method according to the invention is that checking the stored error messages provides a simple way of recognizing failure or manipulation of a sensor. This can be used both for service purposes in the workshop and for random checking by the police, i.e. the storage of the error message makes it possible to check whether the recorded speed is correct or incorrect. The speed is recorded only when the sensors are intact and have not been manipulated. Since, when the registration-relevant or obligatorily recorded information is calculated or registered, a plurality of data sources are available and failure or manipulation of a sensor is recognized, the speed to be stored can nevertheless be ascertained. The fact that a sensor has an associated pilot function and the pilot sensor is checked for plausibility using the signals from the at least two other sensors allows an error by or manipulation of the pilot sensor to be recognized. The ascertainment of a significantly different signal from the pilot sensor means that it is possible for the registration-relevant information to be captured and stored despite an error by or manipulation of the pilot sensor. The stipulation of how many sensors are a requisite plurality is made on the basis of the number of sensors. If there are three sensors, for example, of which two sensors supply signals which differ from one another within particular limit values only, a signal from the pilot sensor which differs significantly therefrom can be recognized by virtue of the two signals from the other two sensors. To ascertain the speed as reliably as possible, with a relatively large number of sensors a stipulation will be made that correspondingly more sensors also need to supply signals which differ from one another within particular limit values only.

An advantage of the method according to the invention is that checking the stored error messages provides a simple way of recognizing failure or manipulation of a sensor. This can be used both for service purposes in the workshop and for random checking by the police, i.e. the storage of the error message makes it possible to check whether the recorded speed is correct or incorrect.

In one preferred embodiment, the signals are checked for plausibility and the speed stored for the vehicle is ascertained using only one signal. If the signals differ from one another within particular limit values only, the speed is recorded only when the sensors are intact and have not been manipulated.

In an alternative preferred embodiment, the computation unit is used to compare the signals from at least three independent sensors with one another and to check them for plausibility by virtue of signals which differ significantly from a plurality of signals being excluded from the detection and the speed to be stored for the vehicle being ascertained using only one or more of those signals which differ from one another within particular limit values only. Since, when the registration-relevant or obligatorily recorded information is calculated or registered, a plurality of data sources are available and failure or manipulation of a sensor is recognized, the speed to be stored can nevertheless be ascertained.

Also preferred is an embodiment of the method in which a sensor has an associated pilot function and the pilot sensor is checked for plausibility using the signals from the at least two other sensors. This allows an error by or manipulation of the pilot sensor to be recognized.

Preferably, in the case of signals which are supplied by a plurality of the sensors and which differ from one another within particular limit values only, a signal from the pilot sensor which differs significantly therefrom is flagged as erroneous, the speed is ascertained using only the plausibility-checked signals from the other sensors, and an error message is stored in the memory. This allows the registration-relevant information to be captured and stored despite an error by or manipulation of the pilot sensor. The stipulation of how many sensors are a requisite plurality is made on the basis of the number of sensors. If there are three sensors, for example, of which two sensors supply signals which differ from one another within particular limit values only, a signal from the pilot sensor which differs significantly therefrom can be recognized by virtue of the two signals from the other two sensors. To ascertain the speed as reliably as possible, with a relatively large number of sensors a stipulation will be made that correspondingly more sensors also need to supply signals which differ from one another within particular limit values only.

In one preferred embodiment, the data are transmitted between at least one sensor and the computation unit in encrypted form in order to additionally protect the method against manipulation.

The subject matter of the invention is also a tachograph system for capturing registration-relevant vehicle data which has at least three sensors for detecting the speed of the vehicle, a computation unit, connected to the sensors, for comparing the signals and for excluding erroneous signals, and also a memory for storing at least the speed as a piece of registration-relevant information, wherein at least one of the sensors is a tachometer which is arranged on the output side of the gearbox and is used as a sensor for the speed detection. For the comparison of the signals, the tachometer has an associated pilot function, wherein the signal from the tachometer can be checked for plausibility using the other sensors and the computation unit can be used to exclude erroneous signals and also the speed can be ascertained using only those signals supplied by the sensors which differ from one another within particular limit values only. The tachometer is what is known as a speed sensor which is usually used in tachographs. The three sensors allow an erroneous or manipulated sensor to be ascertained in order to increase the reliability of the system.

The subject matter of the invention is also a tachograph system for capturing registration-relevant vehicle data which has at least three sensors for detecting the speed of the vehicle, a computation unit, connected to the sensors, for comparing the signals and for excluding erroneous signals, and also a memory for storing at least the speed as a piece of registration-relevant information. The three sensors allow an erroneous or manipulated sensor to be ascertained in order to increase the reliability of the system.

Preferably, at least one of the sensors is a tachometer which is arranged on the output side of the gearbox and is used as a sensor for the speed detection. This is what is known as a speed sensor, which is usually used in tachographs.

In one particularly preferred embodiment, at least one of the sensors is a position sensor which captures position data for the vehicle, and the speed can be ascertained using the signals from the position sensor. The position sensor used may be a GPS receiver which is integrated in the computation unit. The GPS receiver uses satellite signals to ascertain position data for the motor vehicle, from which it is possible to calculate a distance actually traveled and, together with a time recorded for this traveled distance, a speed of travel over this distance. Since navigation systems are often present anyway in modern vehicles, the position sensor used may also be the GPS receiver of the navigation system. It is likewise conceivable for the position sensor used to be the GPS receiver of a controller for what is known as tracking, which is used to report to a control center about the current location of the vehicle. The capture of position data is also possible using fixed-location transponders and/or transmitters. This can be done using apparatuses for recording a road toll, for example, which provide the passing vehicle with position data.

Preferably, at least one of the sensors is an ABS wheel sensor for ascertaining the wheel speed, which can be used to ascertain the speed. Since ABS systems are present as standard in modern vehicles, it is possible to resort to them in order to keep down the complexity and costs for the tachograph system as much as possible. Since narrow bend radii or slippage of a drive wheel, for example, result(s) in differences in the wheel speeds of the various wheels among one another, it is possible to form an average from the ABS wheel sensors which are present on the various wheels of an axle. The wheel sensor values can also be corrected using a steering angle sensor, which is provided anyway in the case of electronic stability programs. This then allows all sensors to be used independently of one another, so that security against manipulation is increased further.

Also preferred is an embodiment in which at least one of the sensors is a tachometer for detecting the engine speed and, together with a gear sensor for detecting the selected gear, is provided for the speed detection. Since the engine speed is detected anyway, this provides a further inexpensive sensor.

From the list of the various sensors, it is possible to see that the plausibility checking for the speed detected by the tachograph system is preferably performed using sensors which are present in the vehicle anyway. The greater the number of independent signals, the greater the protection for the system against manipulation or erroneous sensors. Since a large number of additional sensors means that manipulation is successful only if all the sensors are manipulated in the same way, the "speed sensor" can be of relatively simple design, i.e. without a high level of protection against manipulation, such as sealing or the encrypted transmission of the data, as far as this is legally possible.

BRIEF DESCRIPTION OF THE DRAWINGS

An exemplary embodiment of the invention is discussed below in more detail with reference to the appended drawings, in which.

DETAILED DESCRIPTION OF THE PRESENTLY PREFERRED EMBODIMENTS

Figure 1:
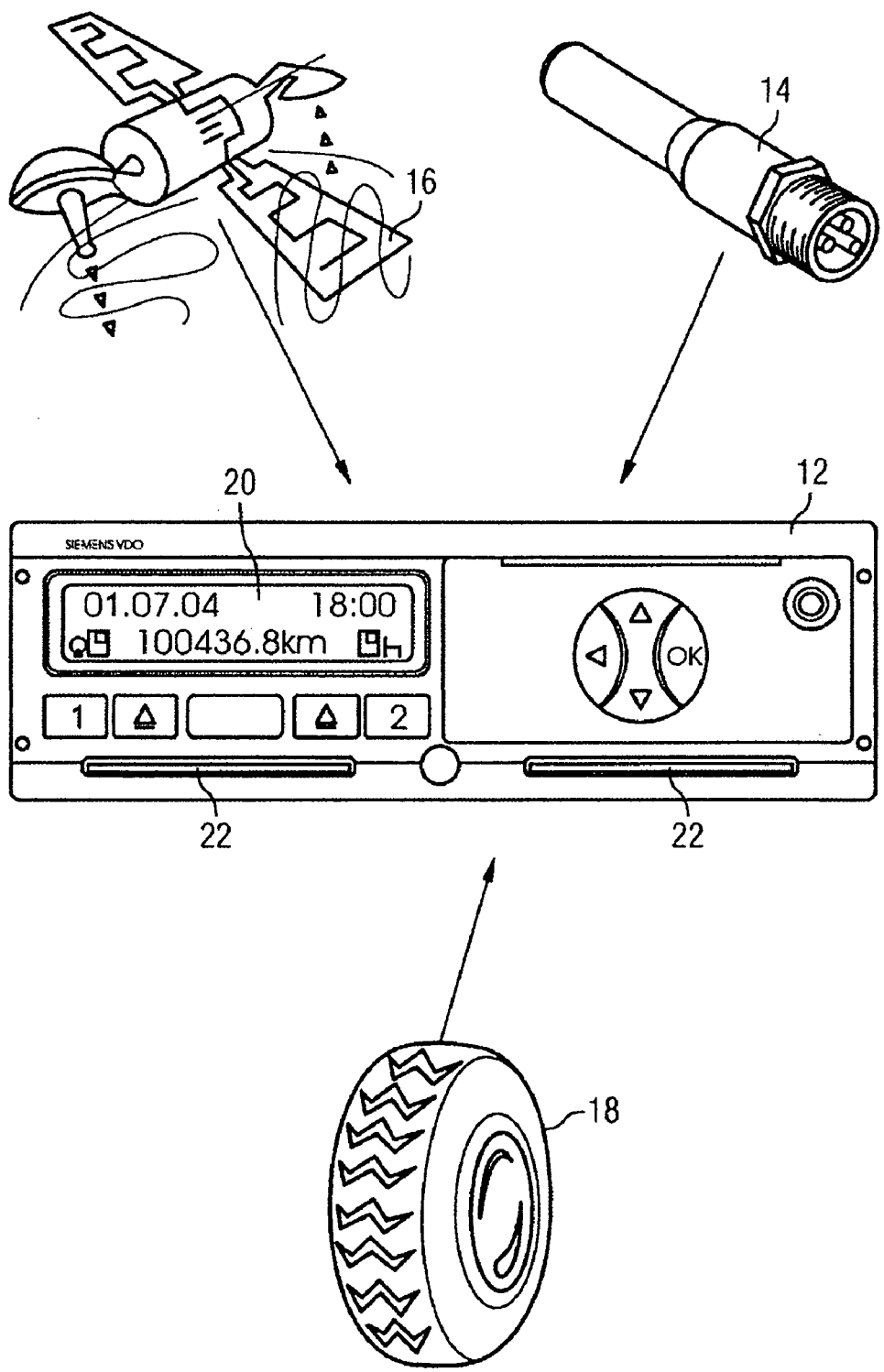
FIG. 1 is a diagram of a tachograph system according to one embodiment of the invention with a registration unit and three independent sensors.

FIG. 1 schematically shows a design of a tachograph system according to one embodiment of the invention. A registration unit 12 contains a computation unit. The registration unit 12 is coupled to at least three independent sensors 14, 16, and 18 for detecting the speed of a vehicle. The first sensor 14 is what is known as a speed sensor, which is arranged as a tachometer on an output side of the vehicle's gearbox. The second sensor 16 is a position sensor, which uses GPS signals to capture position data for the vehicle that can be used to ascertain the speed of the vehicle. The third sensor 18 is an ABS wheel sensor for ascertaining the wheel speed, which can be used to ascertain the speed.

The registration unit 12 has a display apparatus 20 and read/write devices 22 for inserting chip cards for storing registration-relevant information.

The computation unit of the registration unit 12 is used to detect the signals from the sensors 14, 16, and 18. The signals are compared with one another and checked for plausibility by excluding from the detection signals which differ significantly from a plurality of signals and ascertaining the speed to be stored for the vehicle using only those signals which differ from one another within particular limit values only. Depending on the signals produced by the sensors 14, 16, and 18, it may be necessary to condition the signals in order compare them. This would be the case, for example, if one sensor outputs a voltage signal and another sensor produces a pulsed signal. It goes without saying that it is also possible to use the various signals to calculate a respective speed for the vehicle, and to compare the speeds with one another. The limit values can be determined both absolutely and relatively on the basis of the speed of the vehicle.

If all three signals differ from one another within particular limit values only, it can be assumed that there is neither manipulation nor an error in a sensor 14, 16, and 18. Accordingly, all three signals from the sensors 14, 16, and 18 can be used to ascertain the speed to be stored, or the signal from a preferred sensor.

If one of the signals differs significantly from the other signals, this is an indication of an erroneous or manipulated sensor 14, 16, 18. The significantly different signal is excluded from the detection, so that the speed to be stored for the vehicle is ascertained using only the other signals, which differ from one another within particular limit values only, with either a particular signal being selected or the values of the correctly operating sensors being averaged.

The sensor 16 may be a GPS receiver in a navigation system, which today is usually used as a separate fitted appliance. However, the GPS receiver may also be a controller, used primarily in heavy goods vehicles, for what is known as tracking, which merely supplies position data and is not able to calculate route profiles. For the tracking, the position statements are reported to a control center for the vehicle fleet, so that the locations of the vehicles can be retrieved by all users of the fleet network. It goes without saying that the GPS receiver 16 may also be integrated in the registration unit 12.

The ABS sensor 18 is a sensor which is typically present in an ABS system in a vehicle. Since vehicles today are usually equipped with an ABS system as standard, the use of an ABS sensor provides an inexpensive sensor for the tachograph system. Since a single ABS sensor supplies a value which differs from the actual speed of the vehicle when driving on narrow bends or when the wheel slips, it may make sense to use all the ABS sensors or the sensors from one axle of the vehicle in order to form an average from the respective signals, said average being sent to the registration unit 12, but the correction can also be made by the signal from a steering angle sensor.

Figure 2:
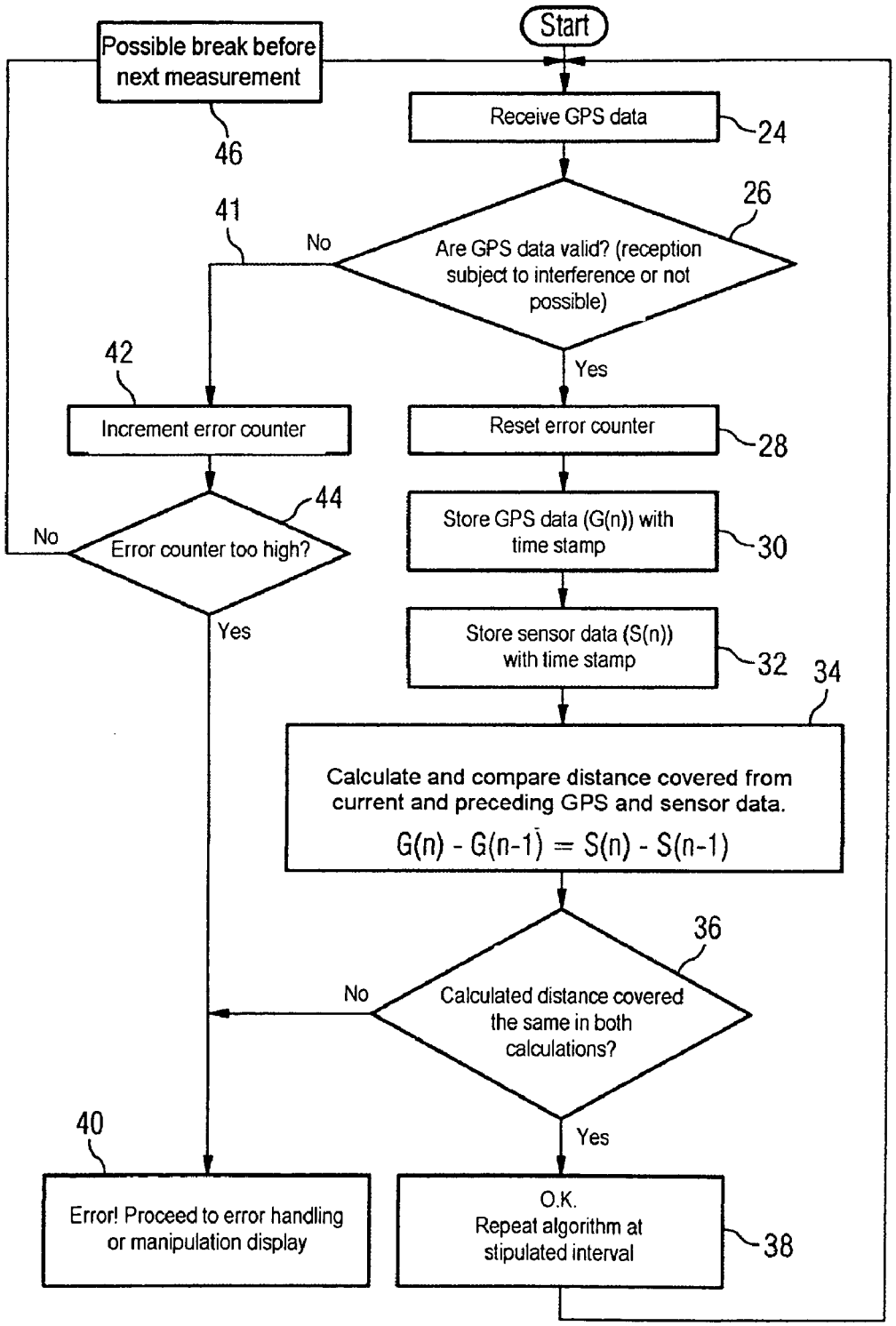
FIG. 2 is a flow chart showing a sequence of a plausibility check using GPS data according to one embodiment of the invention.

FIG. 2 shows a sequence for a plausibility check by way of example, using GPS data. It goes without saying that the sequence can also be transferred to other data.

At the start of the algorithm, GPS data is received 24, these typically being provided by the GPS receiver 16. There is then a check 26 to determine whether the GPS data is valid, i.e. whether reception is subject to interference or is not actually possible. If the GPS data is valid, an error counter in the registration unit 12 is reset 28. The GPS data ($G_{(n)}$) is then stored with a time stamp 30. Immediately thereafter, data ($S_{(n)}$) from another sensor, for example the speed sensor 14, is stored with a time stamp 32. Next, the distance covered is calculated 34 from the current and preceding GPS data and also the current and preceding sensor data. In addition, a comparison 36 is made to determine whether the calculated distance covered is the same in both calculations, i.e. in the case of both sensor data. If the result of the comparison 36 is positive, a signal 38 is produced to repeat the algorithm at stipulated intervals.

If the result of the comparison 36 is negative, i.e. the calculated distances covered are different in magnitude, an error message 40 is produced. This initiates further steps for error handling in the system, and/or a manipulation display is produced on the display apparatus 20 of the registration unit 12. In addition, the error message 40 is stored on the chip card and/or in the registration unit 12.

If the result of the validity check 26 on the GPS data is negative, an error message 41 is produced and hence the error counter is incremented 42. A test 44 on the error counter is used to ascertain whether the error counter exceeds a stipulated value. If this is not the case, a command is produced to receive 24 GPS data again. If appropriate, there is a break 46 provided before the next measurement. If the value on the error counter is above a stipulated value, this indicates that reception 24 of the GPS data is repeatedly subject to interference or not possible. The method is then terminated and the error message 40 appears on the display and is stored on the chip card and/or in the registration unit 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of operating a tachograph system comprising a plurality of sensors and a computation unit configured to detect and store at least a speed as a piece of registration-relevant information for the tachograph system, the method comprising:
   detecting a signal from each of the plural sensors for determining the speed;
   checking the detected signals for plausibility by comparing the detected signals;
   storing a sensor-related error message if the detected signals differ more than a predetermined amount;
   checking one of the plural sensors that is a pilot sensor and has an associated pilot function for plausibility using the detected signals from the other plural sensors;
   flagging the pilot sensor as erroneous when the signals supplied by the other plural sensors differ from one another within a preset limit and a signal from the pilot sensor differs beyond the preset limit;
   ascertaining the speed based on the plausibility-checked signals from a majority of the plural sensors when the pilot signal is flagged as erroneous, wherein the signals from the majority of the plural sensors differ from each other within a preset limit; and
   storing an error message when the pilot signal is flagged as erroneous.

2. The method as claimed in claim 1, wherein data is transmitted between at least one of the plural sensors and the computation unit in encrypted form.

3. A tachograph system for capturing registration-relevant vehicle data comprising:
   a plurality of sensors configured to detect a speed of the vehicle and output a signal representing the detected speed, wherein one of the sensors is a tachometer on an output side of a vehicle gearbox configured for speed detection;
   a computation unit coupled to the tachometer and the plural sensors configured to compare the signals output by the tachometer and the plural sensors and check the signal from the tachometer for plausibility using the plural sensors;
   a memory for storing at least the speed as a piece of registration-relevant information,
   wherein the computation unit is configured to:
      exclude erroneous signals and ascertain the speed using only those signals supplied by the sensors which are within particular limit values and
      the ascertained speed is determined using signals from a majority of the plural sensors.

4. The tachograph system as claimed in claim 3, wherein the tachometer is sealed.

5. The tachograph system according to claim 3, wherein at least one of the plural sensors is a position sensor configured to capture position data for the vehicle, and the speed can be ascertained using the signals from the position sensor.

6. The tachograph system according to claim 5, wherein the position sensor is a GPS receiver integrated in the computation unit.

7. The tachograph system according to claim 5, wherein the position sensor is a GPS receiver in a navigation system.

8. The tachograph system as claimed in one of claim 3 wherein at least one of the plural sensors is an ABS wheel sensor.

9. The tachograph system according to claim 3, wherein at least one of the plural sensors is a tachometer for detecting an engine speed and, together with a gear sensor for detecting a selected gear, is configured for speed detection.

10. The tachograph system according to claim 3, wherein at least one of the plural sensors is a receiver for receiving a speed ascertained by a fixed speed-measuring device.

11. The tachograph system according to claim 3, wherein data transmitted between at least one sensor and the computation unit is encrypted.

12. A method of operating a tachograph system comprising:
   receiving a plurality of data from a first source;
   storing the received plural data with respective time stamps;
   storing sensor data from a plurality of sensors with respective time stamps;
   checking the stored received data for plausibility by comparing them to the stored data from the plural sensors;
   checking the first source that is a pilot sensor and has an associated pilot function for plausibility using the stored data from a majority of the plural sensors;
   calculating at least one of distance and speed based on the plausibility-checked signals for each of the sensor data and received data;
   comparing the at least one of the calculated distance and speed,
   wherein the steps of calculating and comparing are repeated when the compared calculated distance and speed are within prescribed limits and
   wherein an error message is generated and stored when the compared at least one of the calculated distance and speed are not within the prescribed limits.

13. The method of operating a tachograph system according to claim 12, wherein the first source is a GPS source.

14. The method of operating a tachograph system according to claim 12, further comprising incrementing an error counter when the received plural data is invalid.

15. The method of operating a tachograph system according to claim 12, wherein the sensor data generated by one of a tachometer and an ABS sensor.

* * * * *